(12) United States Patent
Yoshida et al.

(10) Patent No.: US 9,230,574 B2
(45) Date of Patent: Jan. 5, 2016

(54) MAGNETORESISTIVE HEAD WITH A CPP STRUCTURE HAVING SUPPRESSED SIDE READING

(75) Inventors: Nobuo Yoshida, Kanagawa (JP); Katsuro Watanabe, Ibaraki (JP); Masahiro Ousugi, Aichi (JP); Atsushi Kato, Kanagawa (JP)

(73) Assignee: HGST Netherlands B.V., Amsterdam (NL)

( * ) Notice: Subject to any disclaimer, the term of this patent is extended or adjusted under 35 U.S.C. 154(b) by 1443 days.

(21) Appl. No.: 12/631,295

(22) Filed: Dec. 4, 2009

(65) Prior Publication Data
US 2010/0142100 A1    Jun. 10, 2010

(30) Foreign Application Priority Data
Dec. 4, 2008 (JP) .................................. 2008-309726

(51) Int. Cl.
| | |
|---|---|
| *G11B 5/39* | (2006.01) |
| *B82Y 10/00* | (2011.01) |
| *B82Y 25/00* | (2011.01) |

(52) U.S. Cl.
CPC ............... *G11B 5/3909* (2013.01); *B82Y 10/00* (2013.01); *B82Y 25/00* (2013.01); *G11B 5/3932* (2013.01); *G11B 2005/3996* (2013.01); *Y10T 29/49032* (2015.01)

(58) Field of Classification Search
CPC ............... G11B 5/3903; G11B 5/3932; G11B 2005/3996
USPC .................. 360/324.1, 324.11, 324.12, 324.2
See application file for complete search history.

(56) References Cited

U.S. PATENT DOCUMENTS

| | | | | |
|---|---|---|---|---|
| 6,198,608 | B1* | 3/2001 | Hong et al. | 360/320 |
| 6,636,400 | B2* | 10/2003 | Pinarbasi et al. | 360/324.12 |
| 2001/0043448 | A1* | 11/2001 | Iwasaki et al. | 360/324.12 |
| 2002/0064005 | A1* | 5/2002 | Arasawa et al. | 360/324.12 |
| 2003/0039079 | A1* | 2/2003 | Zheng et al. | 360/324.1 |
| 2003/0161080 | A1* | 8/2003 | Ishikawa et al. | 360/324.12 |
| 2004/0114285 | A1* | 6/2004 | Ishikawa et al. | 360/324.12 |
| 2005/0146813 | A1* | 7/2005 | Oshima | 360/324.12 |
| 2005/0270703 | A1* | 12/2005 | Hayakawa et al. | 360/324.1 |
| 2006/0279881 | A1* | 12/2006 | Sato | 360/324.12 |
| 2008/0074800 | A1 | 3/2008 | Kagami et al. | 360/314 |

FOREIGN PATENT DOCUMENTS

| | | | | |
|---|---|---|---|---|
| JP | 2005-346869 | | 12/2005 | ............... G11B 5/39 |
| JP | 2008-084373 | | 4/2008 | ............... G11B 5/39 |

* cited by examiner

*Primary Examiner* — Adam B Dravininkas
(74) *Attorney, Agent, or Firm* — Zilka-Kotab, PC

(57) ABSTRACT

According to one embodiment, a CPP structure magnetoresistive head includes a magnetoresistive sensor film between a lower shield layer and an upper shield layer and a longitudinal biasing layer disposed at each side of the magnetoresistive sensor film via a read track width defining insulator film. In the stripe height direction, the length of the longitudinal biasing layer is longer than the length of a second ferromagnetic layer in which its magnetization rotates in response to the external magnetic field. The second ferromagnetic layer is one of the layers comprising the magnetoresistive sensor film. At a stripe height, the surface of each longitudinal biasing layer has a step to change the thickness thereof across the step so that the air bearing surface section thereof has a larger thickness than any other section. Other structures using a magnetoresistive head and methods of production thereof are described as well.

17 Claims, 9 Drawing Sheets

US 9,230,574 B2

MAGNETORESISTIVE HEAD WITH A CPP STRUCTURE HAVING SUPPRESSED SIDE READING

RELATED APPLICATIONS

The present application claims priority to Japanese Patent Application No. 2008-309726, filed Dec. 4, 2008, which is incorporated herein by reference.

FIELD OF THE INVENTION

The present invention relates to a magnetic data storage, and more particularly, to a magnetoresistive head having a current-perpendicular-to-the-plane (CPP) structure with a sense current flowing across a layered magnetoresistive effect film.

BACKGROUND OF THE INVENTION

Magnetoresistive sensors, which utilize the magnetoresistive effect in which electrical resistance changes in response to changes of the external magnetic field, is known as a good magnetic field sensor and is used practically as a read head in magnetic heads, a key component of magnetic storage devices.

With the progress in size reduction of magnetic recording and reproducing devices, improvements in the performance of magnetic heads to read and write information would enable the heads to operate even better. Currently, a magnetic head generally has two heads: a read head to read information, and a write head to write information. Commonly, the read head is a CPP structure magnetoresistive effect head enabling high read resolution.

To realize still higher recording densities, some problems associated with the read head may be solved. The problems include higher accuracy fabrication of the read head element section and improvement in the stability of the read performances.

Raising the recording density involves narrowing the read track width. Here, the read track width is the across-the-track width of the magnetoresistive sensor film which detects a signal from a recording medium. Preferably, in view of productivity, the read track width is formed during the lift-off process, since it is a simple process. For this purpose, the height of the lift-off mask material has a certain level. To form a narrow read track width, the pattern width of the lift-off mask material is narrowed. Therefore, the ratio of the height to the pattern width in the lift-off mask material (aspect ratio) becomes high, which may result in a lowered pattern accuracy of the lift-mask material due to bending, collapse of the mask pattern, etc. In addition, the stripe height has an effect on the performance of the read head, and may also be formed with a higher accuracy. The stripe height is the length of the magnetoresistive sensor film in the depth direction.

Narrowing the read track width affects the stability of the read performances, too. Generally, to stably reproduce a good waveform with sufficiently low noise, the stripe height is shortened, which corresponds to a narrow read track width. This is because the magnetic anisotropy is one of the factors affecting the stable operation. The magnetic anisotropy is determined by the shape of the free layer in which magnetization rotates depending on the magnetic field from the recording medium. The free layer is one of the ferromagnetic layers which comprise the magnetoresistive sensor film.

In addition, the free layer is provided with a longitudinal bias layer on each side thereof, via an insulator layer in a track width direction, to apply a longitudinal bias field thereto so that the magnetization rotates without causing noise. Shortening the stripe height makes the longitudinal biasing layer more subject to thermal fluctuations since the length of the longitudinal biasing layer in the stripe height direction inevitably becomes shorter.

Japanese Patent Office (JPO) Pub. No. JP-A-2005-346869 and JP-A-2008-84373 disclose CPP structure magnetoresistive heads each comprising a magnetoresistive sensor film and longitudinal biasing layer whose stripe height is longer than that of the magnetoresistive sensor film.

Each of these current structures has problems associated with their use and/or production. Therefore, a magnetoresistive sensor which eliminates or lessens these problems would be beneficial to the field of magnetic recording.

SUMMARY OF THE INVENTION

According to one embodiment, a magnetoresistive head includes a magnetoresistive sensor film which includes a stack. The stack includes a pinning layer, a first ferromagnetic layer, an intermediate layer, and a second ferromagnetic layer positioned between a lower shield layer and an upper shield layer. A sense current flows across the first ferromagnetic layer, the intermediate layer, and the second ferromagnetic layer. The magnetoresistive sensor film also includes a longitudinal biasing layer having a length in a stripe height direction which is longer than a length of the second ferromagnetic layer in the stripe height direction, the longitudinal biasing layer being disposed at each side of the magnetoresistive sensor film via an insulator film for insulation in a track width direction. A surface of the longitudinal biasing layer has a step at the stripe height which changes a thickness of the longitudinal biasing layer across the step so that an air bearing surface section of the longitudinal biasing layer has a larger thickness than any other section and the magnetoresistive sensor film detects a change in a resistance in response to a change of an external magnetic field.

According to another embodiment, a method of manufacturing a magnetoresistive head includes depositing a magnetoresistive sensor film on a lower shield layer, depositing a read track width defining mask material on the magnetoresistive sensor film so as to mask a region whose width is a read track width of a sensor section, removing the magnetoresistive sensor film from an unmasked region disposed on each side of the read track width, depositing a longitudinal biasing layer in a region where the magnetoresistive sensor film has been removed, removing the read track width defining mask material, depositing a second stripe height defining mask material on the magnetoresistive sensor film and the longitudinal biasing layer so as to mask a region which is to become a head element section, removing the magnetoresistive sensor film and the longitudinal biasing layer from an unmasked region, depositing a first insulator film for insulation in a stripe height direction, removing the second stripe height defining mask material, depositing a first strip height defining mask material on the magnetoresistive sensor film and the longitudinal biasing layer so as to mask an air bearing surface section and to unmask a stripe height end side portion of a section which is covered by the second stripe height defining mask, thinning the magnetoresistive sensor film and the longitudinal biasing layer in an area in which the mask material is not disposed by limited removal, depositing a second insulator film for insulation in the stripe height, and removing the first stripe height defining mask material.

Any of these embodiments may be implemented in a magnetic data storage system such as a disk drive system, which may include a magnetic head, a drive mechanism for passing a magnetic medium (e.g., hard disk) over the magnetic head, and a controller electrically coupled to the magnetic head.

Other aspects and advantages of the present invention will become apparent from the following detailed description, which, when taken in conjunction with the drawings, illustrate by way of example the principles of the invention.

DETAILED DESCRIPTION

Figure 1:
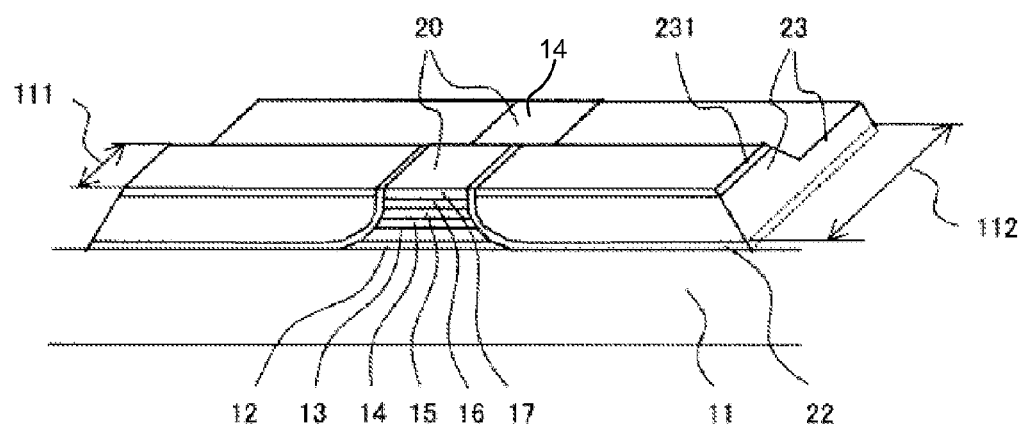
FIG. 1 is a perspective view of a magnetoresistive head in accordance with an embodiment after fabrication of the longitudinal biasing layer is completed.

In the prior art structures disclosed in JPO Pub. Nos. JP-A-2005-346869 and JP-A-2008-84373, the length of the longitudinal biasing layer in the stripe height direction is made longer than the stripe height of the magnetoresistive sensor film so that the longitudinal biasing layer has a sufficiently large length in the stripe height direction.

In the structure disclosed in JPO Pub. No. JP-A-2005-346869, an insulator layer is used as a protective layer, and is provided on the longitudinal biasing layer which is a hard magnetic layer. The insulator layer prevents the longitudinal biasing layer from being etched until the magnetoresistive sensor film is completely etched to the desired dimensions. At the air bearing surface (ABS), since the insulator layer retains its thickness as deposited, the distance between the upper shield layer and the lower shield layer becomes wider in the region where the longitudinal biasing layer is disposed, particularly along the side of the magnetoresistive sensor film, compared with the region where the magnetoresistive sensor film is formed.

Also, in JPO Pub. No. JP-A-2008-84373, the above-mentioned protective layer is deposited, although the protective layer is made of a metal such as Cr instead of an insulator. Thus, at the ABS, the distance between the upper and lower shield layers becomes similarly wider in the region where the longitudinal biasing layer is disposed than in the region where the magnetoresistive sensor film is disposed.

When the distance between the upper and lower shields becomes wider along the side of the magnetoresistive sensor film as mentioned above, the side reading occurs, which lowers the signal to noise ratio (SNR) since the reading resolution is lowered or noise and signal are read from the track edge or the adjacent track.

In addition, JPO Pub. No. JP-A-2008-84373 discloses a manufacturing method which does not form the above-mentioned protective layer. In this method, a sufficiently thick film used as a longitudinal biasing layer is deposited and, while the magnetoresistive sensor film is etched to the desired dimensions, the longitudinal biasing layer is etched to a desired thickness. In this case, since the surface of the longitudinal biasing layer is entirely exposed in a removal process of a lift-off mask material, the yield may decrease due to corrosion.

According to one embodiment, a CPP structure magnetoresistive head in which the magnetoresistive sensor film is formed with highly accurate geometrical dimensions is provided, having superior read performance along with suppressed side reading. The read performances are quite stable and manufacturing is possible at a high yield.

In one embodiment, a magnetoresistive head comprises a magnetoresistive sensor film including, between a lower shield layer and an upper shield layer, a stack of at least a pinning layer, a first ferromagnetic layer, an intermediate layer and a second ferromagnetic layer, and a longitudinal biasing layer disposed at each side of the magnetoresistive sensor film via an insulator film for insulation in the track width direction, in which a sense current flows across the first ferromagnetic layer, the intermediate layer and the second ferromagnetic layer, and the magnetoresistive sensor film detects change in the resistance in response to change of the external magnetic field, wherein a length of the longitudinal biasing layer in the stripe height direction is longer than a length of the second ferromagnetic layer in the stripe height direction, and a surface of the longitudinal biasing layer has a step at a stripe height to change a thickness of the longitudinal biasing layer across the step so that an ABS section of the longitudinal biasing layer has a larger thickness.

The longitudinal biasing layer may be constructed by using a hard magnetic layer or a stack of a ferromagnetic layer and an antiferromagnetic layer.

In the former case, it is preferable to deposit a protection film of about 10 nm or thinner on the ABS section of the hard magnetic layer, when desired. In addition, a length of the longitudinal biasing layer in the stripe height direction is preferably longer than a length of the second ferromagnetic layer in the stripe height direction and longer than or substantially equal to a length of the first ferromagnetic layer.

In the latter case, a section of the longitudinal biasing layer, the section being thinner than the ABS section, has a highly resistive antiferromagnetic material deposited thereon. A length of the first ferromagnetic layer in the stripe height direction preferably is shorter than a length of the longitudinal biasing layer in the stripe height direction.

The magnetoresistive head, according to one embodiment, is characterized in that superior read performances are exhibited with suppressed side reading and the stability of the read performances is improved since the protective layer on the longitudinal biasing layer can be thinned and thereby the distance between the upper and lower shield layers can be shortened. In addition, according to the manufacturing method for magnetoresistive heads, forming a magnetoresistive sensor film is possible with high accuracy geometrical dimensions that are a factor toward defining read performances and, since corrosion hardly occurs, high yield manufacturing is attained, according to some embodiments.

Figure 2:
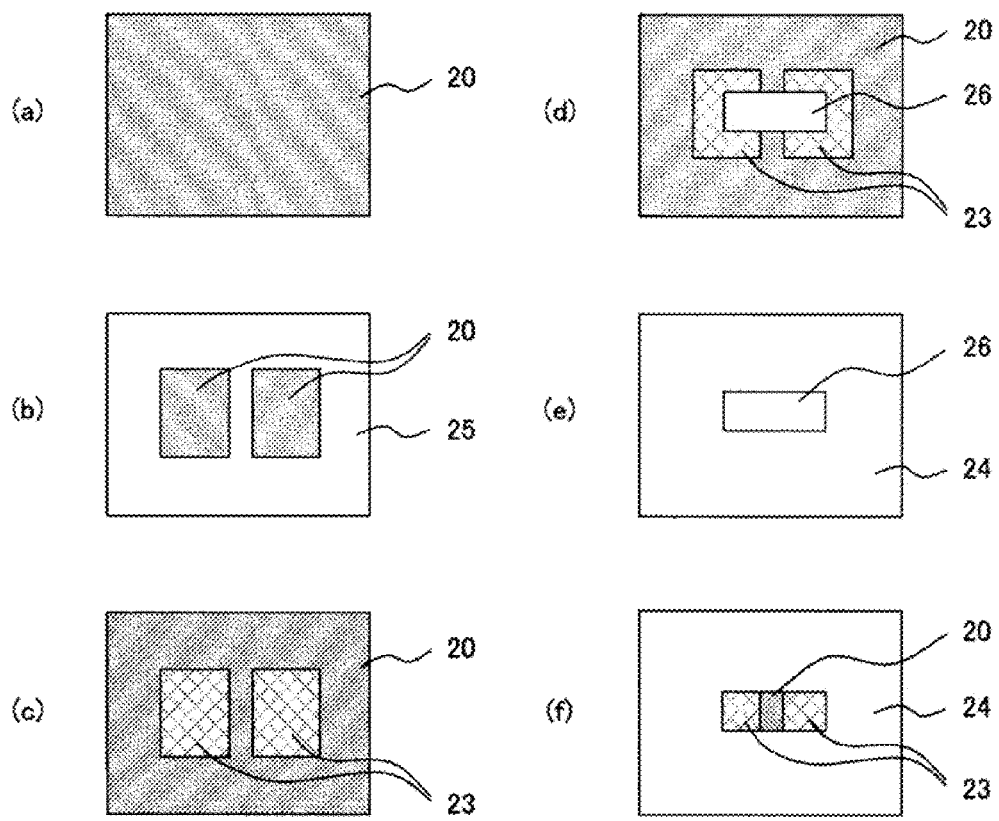
FIG. 2 schematically shows a process flow of the read track width-first method, according to one embodiment.
Figure 3:
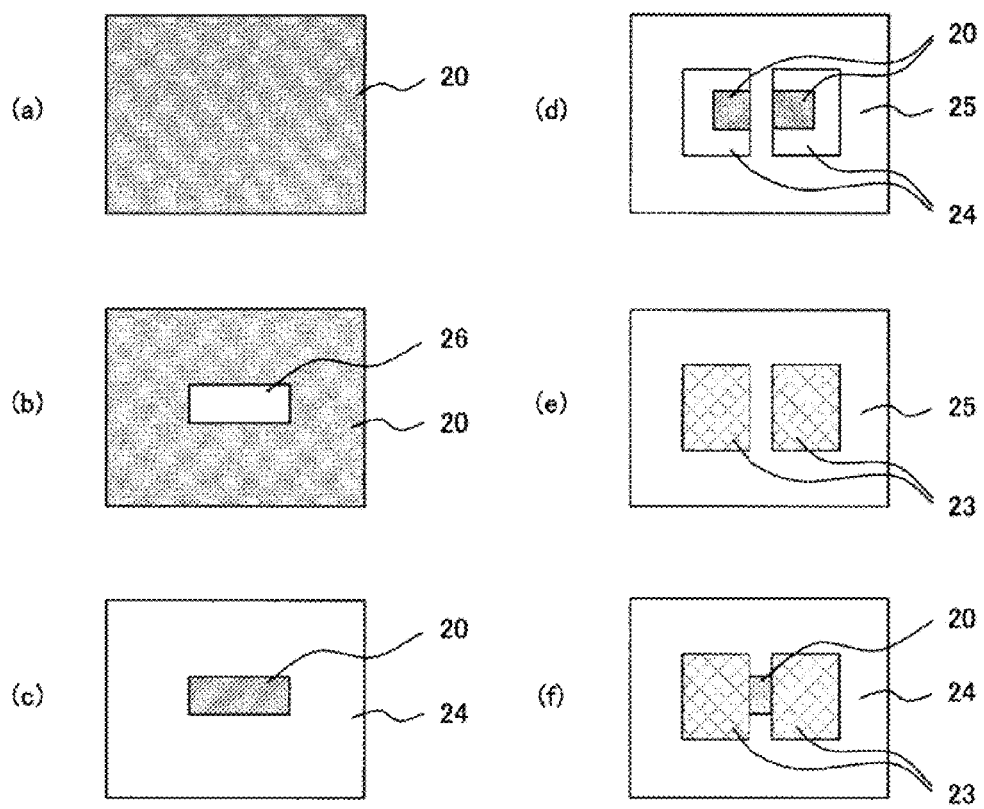
FIG. 3 schematically shows a process flow of the stripe height-first method, according to one embodiment.

The following provides a description of how to form a magnetoresistive sensor film with highly accurate geometric dimensions. There are two methods for forming a magnetoresistive sensor film: (1) Read track width-first method in which pattern formation is made in the track width direction at first, and (2) Stripe height-first method in which pattern formation is made in the stripe height direction at first. The respective process flows are schematically illustrated in FIG. 2 and FIG. 3, where substrates are viewed from above. For making the description easy to understand, the vertical and horizontal scales are made different and the shape of the pattern is assumed to be rectangular. An actual magnetoresistive sensor film may differ from that shown in the figures.

In the read track width-first method, a read track width defining mask material 25 is disposed, as shown in FIG. 2(b), in a region where a magnetoresistive sensor film 20 is formed, according to one embodiment. The mask material is not deposited in two square areas near the center, as shown in the figure. The two square parts of the magnetoresistive sensor film 20 are etched off in the next step. Then, after read track width defining insulator layer 22 and longitudinal biasing layer 23 are deposited, the read track width defining mask material 25 is lifted off. Note that since each read track width defining insulator layer 22 is disposed on the substrate side of a longitudinal biasing layer 23, only the end portion thereof comes out. That is, almost all of the read track width defining insulator layer 22 is not visible when the substrate is viewed from above, as shown in FIG. 2(c).

Then, a stripe height defining mask material 26 is disposed in a predetermined place, as shown in FIG. 2(d). The mask material is deposited in a square area at the center of the figure. Excluding this area, a stripe height defining insulator layer 24 is deposited after the remaining films are etched off, like in FIG. 2(e). Then, the stripe height defining mask material 26 is lifted off. The formed pattern is shown in FIG. 2(f). The length of the longitudinal biasing layer 23 in the stripe height direction is almost the same as that of the magnetoresistive sensor film 20.

In the stripe height-first method, a stripe height defining mask material 26 is disposed, as shown in FIG. 3(b), in a region where a magnetoresistive sensor film 20 is formed, like in FIG. 3(a). The mask material is deposited in a square area shown at the center of the figure. Excluding this area, the magnetoresistive sensor film 20 is all etched off. Then, after a stripe height defining insulator layer 24 is deposited, the stripe height defining mask material 26 is lifted off, as shown in FIG. 3(c). Then, a read track width defining mask material 25 is disposed in a predetermined place. The mask material is not deposited in two square areas near the center of the figure. The parts of the magnetoresistive sensor film 20 in the two square areas are etched off, like in FIG. 3(d). Then, after read track width defining insulator layer 22 and longitudinal biasing layer 23 are deposited, as shown in FIG. 3(e), where only the upper layer, namely the longitudinal biasing layer 23 is visible, the read track width defining mask material 25 is lifted off, like in FIG. 3(f). The formed pattern is such that the length of the longitudinal biasing layer in the stripe height direction is longer than that of the magnetoresistive sensor film 20.

Generally, in a wafer process, since the read track width defining pattern width is narrower than the stripe height defining pattern width, the former pattern width is formed with higher accuracy. The process step for depositing the read track width defining mask material is compared below between the two methods described above. The read track width-first method is shown in FIG. 2(b). The stripe height-first method is shown in FIG. 3 (b).

In FIG. 2(b), the portion which is to become the read track width is the portion sandwiched between the two square areas shown around the center of the figure. The read track width defining mask material 25 is deposited on the magnetoresistive sensor film 20, an optically uniform material. In addition, a film subsequently etched off to define the read track width is only the magnetoresistive sensor film 20 made mainly of metals. This condition may be preferable in view of pattern forming.

In the situation shown in FIG. 3(d), the read track width defining mask material 25 is deposited, ranging over the magnetoresistive sensor film 20 and the stripe height defining insulator layer 24. The former is made of metals while the latter is made of an insulator. Thus, they have optically different properties. In addition, the physical etching rate on insulation material is generally slower than that on metal material. This affects the accuracy of forming the read track width due to re-deposition to the mask material and etching of re-deposition from the mask material wall. Of the boundaries of the magnetoresistive sensor film 20, those disposed under the read track width defining mask material 25 include an important boundary which defines the stripe height. Thus, since masking or etching is not uniformly performed, it is concerned that the magnetoresistive effect film 20 and the longitudinal biasing layer 24 may be disarranged in the vicinity of the boundaries disposed under the mask material 25.

Figure 4:
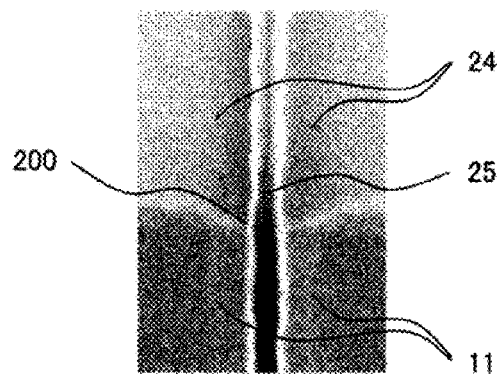
FIG. 4 shows a SEM photograph of the stripe height defining boundary of a magnetoresistive sensor film and its vicinity, taken after the read track width is formed by the stripe height-first method.

FIG. 4 shows a SEM photograph of the stripe height defining boundary of a magnetoresistive sensor film 20 and its vicinity after etching is performed by using a read track width defining mask material 25 according to the stripe height-first method. The read track width defining mask material 25 extends vertically in the figure. In the upper half of the figure, the stripe height defining insulator layer 24 appears. In the lower half of the figure, the lower shield layer 11 appears (since the magnetoresistive sensor film 20 is fully etched off until the lower shield layer thereunder is exposed). Note that the lower shield layer 11 is formed on the substrate when the magnetoresistive sensor film 20 is to be formed, as in FIG. 3(a). The pattern width of the read track width defining mask material 25 is narrower on the stripe height defining insulator layer than on the lower shield layer 11. Thus, when longitudinal biasing layer 23 is deposited at the next step, the distance between them will be narrower on the stripe height defining insulator layer 24 side. This distance varies over the wafer, making the longitudinal bias field variable and therefore lowering the yield. In addition, the boundary between the stripe height defining insulator layer 24 and the lower shield layer 11 is concave around the track portion with a bottom corresponding to a boundary 200 of the magnetoresistive sensor film. Since this U-shape varies over the wafer or is not always the same, the boundary 200 of the magnetoresistive sensor film may be varied. This causes variations of the magnetoresistive effect head in terms of read performances since the stripe height of the magnetoresistive sensor film varies.

As understood from the above description, the read track width-first method is preferable in view of higher accuracy formation of the read track width and stripe height, according to one embodiment. Then, consideration is given below from the viewpoint of the stability of the longitudinal bias field. Using the read track width-first method, the magnetoresistive element has a structure as shown in FIG. 2(f). Using the stripe height-first method, the element is structured as shown in FIG. 3(f). Comparatively, the length of the longitudinal biasing layer 23 in the stripe height direction is almost the same as the stripe height of the magnetoresistive sensor film, in FIG.

2(*f*). As shown in FIG. 3(*f*), the length of the longitudinal biasing layer is longer than the stripe height for the magnetoresistive sensor film.

Figure 5:
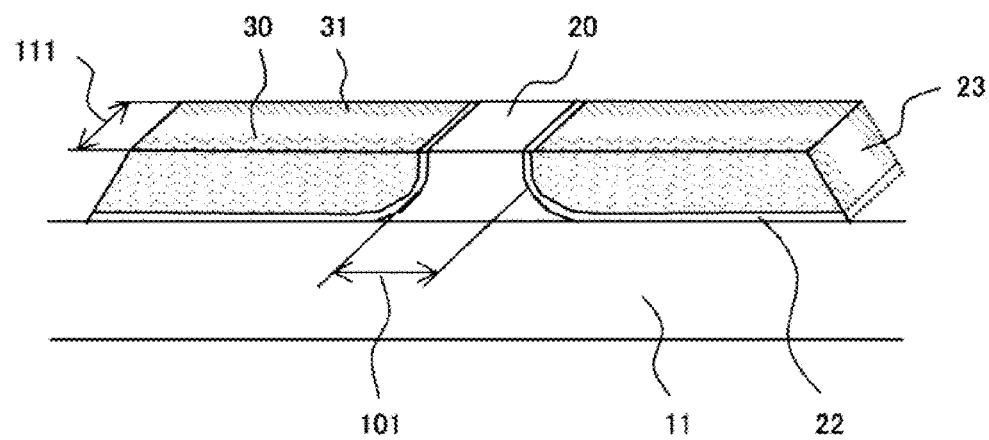
FIG. 5 is provided to explain the damage given to the longitudinal biasing layer, according to one embodiment.

To secure the stability of the read performance, the stripe height is also shortened as the read track width is narrowed. Further, since the ABS side has a damaged layer 30 resulting from lapping and forming the ABS, and the rear side, as viewed in the stripe height direction from the medium, has a damaged layer 31 caused by the etching process as shown in FIG. 5. Also, the effective length of the longitudinal biasing layer is shorter than physical length. In FIG. 5, 101 refers to the read track width and 111 refers to the length of the second ferromagnetic layer (and longitudinal biasing layer) in the stripe height direction. Thus, from the view point of securing the stability of read performance with higher recording density, the read track width-first method may result in a lowered stability of the longitudinal bias magnetic field since the length of the longitudinal biasing layer 23 in the stripe height direction becomes shorter when the influence of the above-mentioned damaged layer is considered. Thus, a new structure that enables higher recording density while realizing not only the high accuracy formation of geometrical dimensions but also the stability of the longitudinal bias field would be very beneficial.

Specific embodiments are described below with reference to the drawings.

Figure 6:
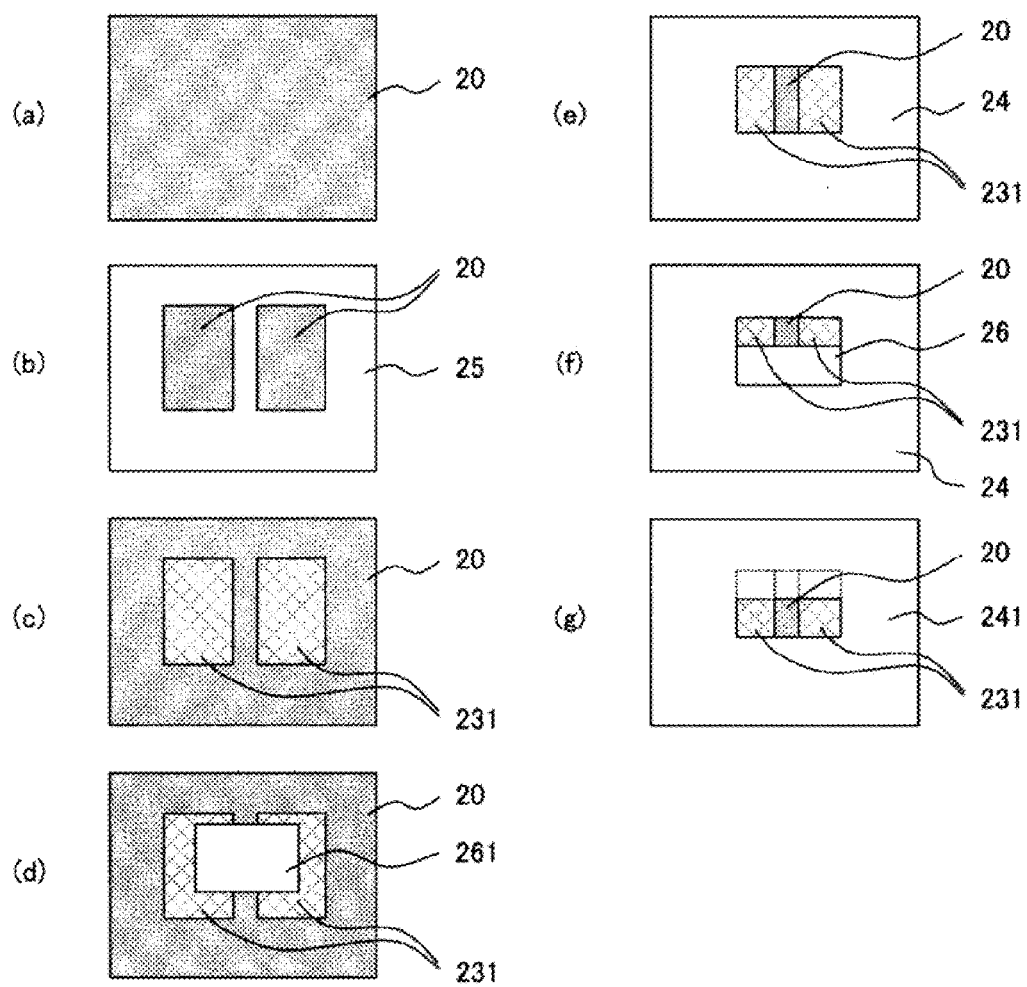
FIG. 6 schematically shows the process flow of a magnetoresistive head in accordance with one embodiment.

FIG. 1 shows a perspective view illustrating a periphery of the magnetoresistive sensor film 20 and longitudinal biasing layer 23 of a magnetoresistive head in accordance with a first embodiment. In this perspective view, formation of the longitudinal biasing layer 23 has just been completed. In addition, FIG. 6 schematically shows the process flow of the magnetoresistive head. In these figures, the vertical and horizontal scales are made different from those of practical ones and the shapes of patterns are assumed to be rectangular for making the description more easy to understand. Therefore, practical ones may differ from the figures.

The surface of a substrate (for example a ceramic containing alumina and titanium carbide) is coated with an insulating film of alumina, or the like. After the surface is flattened by fine polishing, a lower shield layer 11 made of Ni—Fe alloy or the like is deposited by a sputtering method, ion-beam sputtering method, plating method, etc. Then, after the deposited film is patterned to a predefined shape, an insulating layer of alumina or another suitable material is formed so as to cover the whole surface of the substrate. By flattening with the chemical mechanical polishing (CMP) method, the lower shield layer 11 and the surrounding insulating layer are made to have almost the same height. In this process, the surface roughness of the lower shield layer 11 is controlled to below a predetermined level.

In a deposition apparatus, according to one embodiment, after the superficial oxide layer and the like are removed by cleaning, a seed layer 12, pinning layer 13, first ferromagnetic layer 14, intermediate layer 15, second ferromagnetic layer 16 and cap layer 17 are deposited on the substrate, in this order. The seed layer 12 and the cap layer 17 may be Cu, Ta, Ru, Rh, a Ni—Cr—Fe based alloy, a stack of these materials, etc. The pinning layer 13 may be an antiferromagnetic layer of a Pt—Mn based alloy, a Mn—Ir based alloy, etc., or a hard magnetic layer of a Co—Pt based alloy, a Co—Cr—Pt based alloy, etc. The first ferromagnetic layer 14 may be a stack comprising a lower ferromagnetic layer, spacer layer and upper ferromagnetic layer. Each of the lower and upper ferromagnetic layers of this stack and the second ferromagnetic layer 16 may be a Ni—Fe based alloy, a Co—Fe based alloy, a Co—Fe—B based alloy, a Co—Ni—Fe based alloy, a high polarizable material such as magnetite or Heusler alloy, a stack of these materials, etc. The spacer layer may be a metal layer comprising at least one of materials selected from Ru, Rh and Ir, and the thickness thereof is preferably less than about 10 angstroms. When the TMR effect is used, the intermediate layer 15 is a tunnel barrier layer and, specifically, may be made of an oxide of Al, Mg, Si, Zr, Ti, their mixture, a stack of these oxides, etc. When the CPP-GMR effect is used, the intermediate layer 15 is a conductive layer or a conductive layer having a current confining layer and, specifically, may be made of Al, Cu, Ag, Au, their mixture, a stack comprising them, etc. It is also possible to insert a current confining layer or the like by partial oxidizing, nitriding, etc., of the conductive layer. After a magnetoresistive sensor film comprising the seed layer through the cap layer 17 is deposited as described so far, annealing is performed in a magnetic field as necessary to orient the magnetization of the first ferromagnetic layer to a specific direction. Particularly, when the pinning layer 13 is a lattice-ordered antiferromagnetic substance made of a Pt—Mn based alloy, a Mn—Ir based alloy, etc., annealing may be performed in a magnetic field until an ordered structure is formed to generate exchange coupling with the first ferromagnetic layer, as shown in FIG. 6(*a*).

Then, pattern formation is made in the track width direction. On the magnetoresistive sensor film 20, a read track width defining mask material 25 is deposited so as to mask a region whose width is to become the read track width of the sensor section, as shown in FIG. 6(*b*). From the unmasked regions at the respective sides of the read track width, the magnetoresistive sensor film 20 is removed by etching. This etching is performed so as not to leave re-deposition to the side wall of the magnetoresistive sensor film 20, which is to be left unetched. Then, via read track width defining insular layer 22, hard magnetic layer is deposited as a longitudinal biasing layer 23. Being thick enough to generate a desired longitudinal bias field, it is formed almost at the same height as the second ferromagnetic layer 16 whose direction of magnetization rotates according to the external magnetic field. Thereon, longitudinal biasing layer protection layer 231 is deposited. Since the purpose of the longitudinal biasing layer protection layer 231 is to avoid or lighten the process damage by the subsequent step of forming the upper gap layer or upper electrode layer, their thickness may be as small as about 10 nm or less.

Then, the read track width defining mask material 25 is removed to complete the pattern formation in the track width direction, as shown in FIG. 6(*c*). For the read track width defining insulation layer 22, a single-layered film made of material selected from alumina, silicon oxide, tantalum oxide, aluminum nitride, silicon nitride, tantalum nitride, etc., a composite film made of materials selected from above, or a stack of such films may be employed. For the longitudinal biasing layer 23, a hard magnetic film of a Co—Pt based alloy, a Co—Cr—Pt based alloy, etc., may be used. To control the properties, in particular, coercivity of the hard magnetic film, an underlayer film of Cr, Cr—Mo based alloy, Cr—Ti based alloy, etc., may be deposited. For the longitudinal biasing layer protection film 231, a film of Cr, Cr—Mo based alloy, Cr—Ti based alloy, Ru, Rh, Ta, etc., or a stack of such films may be employed.

After the pattern formation in the track width direction is complete, a second stripe height defining mask material 261 is deposited in a predetermined place, as shown in FIG. 6(*d*). The length of the second stripe height defining mask material 261 in the stripe height direction is longer than the length of the portion to be, in the next step, as shown in FIG. 6(*f*), the end of the second ferromagnetic layer 16 in the stripe height direction (a side to be left at the magnetoresistive head after a slider process). Excluding the region which will constitute the read head element section, the magnetoresistive sensor film 20, read track width defining insulation layer 22, longitudinal biasing layer 23 and longitudinal biasing layer protection film 231 are removed by etching. This etching is performed not to leave re-deposition to the side wall of the magnetoresistive sensor film 20, which is to be left unetched. Then, after formation of a first stripe height defining insulation film 24, which is a single-layered film made of material selected from alumina, silicon oxide, tantalum oxide, aluminum nitride, silicon nitride, tantalum nitride etc., a composite film made of materials selected from above, or a stack of such films, the second stripe height defining mask material 261 is removed, as shown in FIG. 6(e).

Then, after a first stripe height defining mask material 26 is deposited in a predetermined place, as shown in FIG. 6(f), etching is performed at least until the second ferromagnetic layer 16 of the magnetoresistive sensor film 20 is removed. Then, after a second stripe height defining insulation layer 241 is deposited, the first stripe height defining mask material 26 is removed, as shown in FIG. 6(g), which is partly depicted as a see-through view to clarify the difference between the length of the longitudinal biasing layer 23 in the stripe height direction and that of the second ferromagnetic layer. Although the depth of etching may exceed the second ferromagnetic layer 16 and reach a lower layer which is nearer to the substrate, this reduces the volume of the longitudinal bias application hard magnetic layer 23 since they are more etched off. Therefore, it is preferable to adjust the depth of etching in consideration of the thermal fluctuation stability of the hard magnetic layer. Since the depth of damage by dry etching is estimated to be about 3.5 nm according to various experiments, the longitudinal bias application hard magnetic layer may have a thickness of 3.5 nm or more to compensate for this. The second stripe height defining insulation layer 241 may use the same material as the stripe height defining insulation layer 24, although they are not so limited.

In a magnetoresistive head structured as described above, the length 112 of the longitudinal biasing layer in the stripe height direction is longer than the length 111 of the second ferromagnetic layer 16 in the stripe height direction, that is, the length of the magnetoresistive sensor film in the stripe height direction. Moreover, as shown in FIG. 1, the first ferromagnetic layer 14 may extend along the stripe height direction such that it is substantially the same as the length 112 of the longitudinal biasing layer 23. Therefore, although the portion of the longitudinal biasing layer 23, the height of the portion being equal to the length 111 of the second ferromagnetic layer 16, is damaged by the etching process, magnetic spin in this portion is supported by exchange interaction with spin in the higher portion of the longitudinal biasing layer than the length 111. In addition, a longitudinal bias field from the higher portion of the longitudinal biasing layer is effective in this portion. Thus, deterioration of the properties of the longitudinal biasing layer can be suppressed. That is, a longitudinal bias magnetic field can be stably applied even when the stripe height of the magnetoresistive sensor film is shortened.

Also in the above-mentioned structure, the hard magnetic layer serving to generate a longitudinal bias magnetic field is less subject to process damage such as corrosion. Specifically, although the longitudinal biasing layer 23 is deposited in the region where the second stripe height defining mask material 261 is deposited, only the portion in the region of the first stripe height defining mask material 26 is exposed to the surface of the substrate subject to process damage such as corrosion after pattern formation is complete in the stripe height direction. That is, the area subject to damage, such as corrosion, can be made smaller than the area of the longitudinal biasing layer 23.

Figure 7:
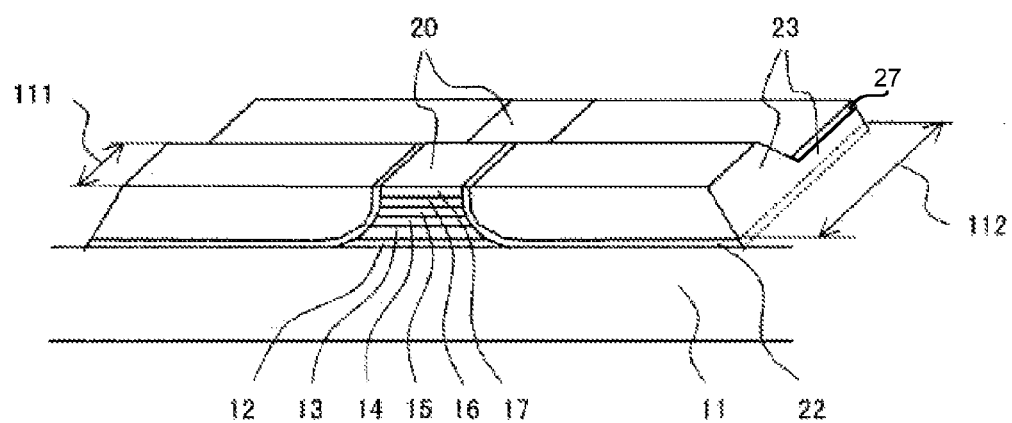
FIG. 7 is a perspective view of a magnetoresistive head in accordance with another embodiment after fabrication of the longitudinal biasing layer is completed.

In addition, since unlike the prior art structures disclosed previously, in which the longitudinal biasing layer is not wholly etched, the thickness of the longitudinal biasing layer protection film 231 is not large. Therefore, at the ABS in which the longitudinal biasing layer protection film 231 is left, the shield-to-shield distance where the longitudinal biasing layer 23 is disposed can be approximated to the shield-to-shield distance where the magnetoresistive sensor film 20 is disposed. This suppresses side reading and thereby raises the reading resolution and signal to noise ratio (SNR) of the magnetoresistive effect head. Moreover, the longitudinal biasing layer 23 may have a high resistive antiferromagnetic material 27 deposited thereon in a section thinner than an air bearing surface section, as shown in FIG. 7.

Figure 10:
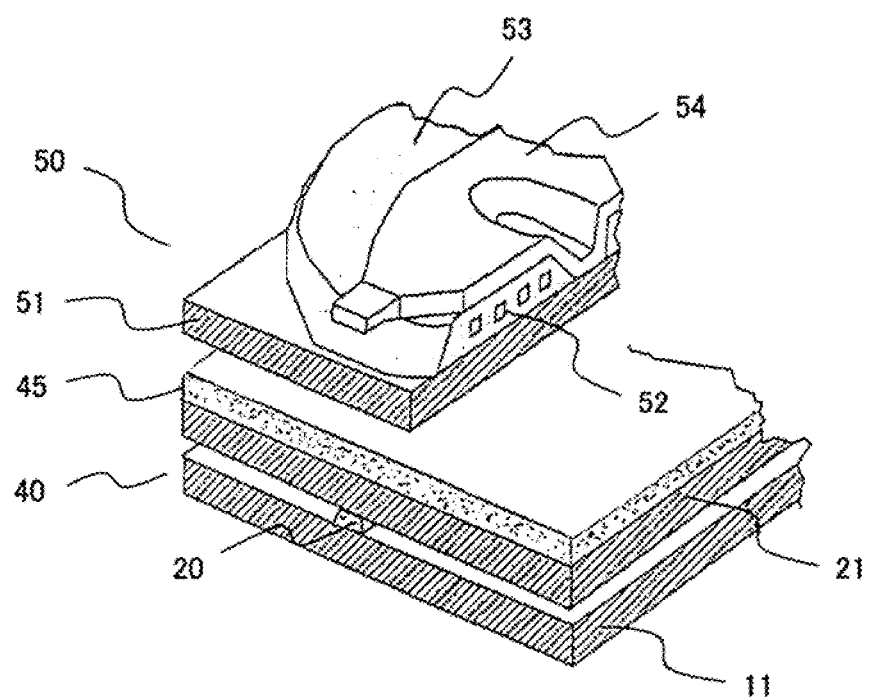
FIG. 10 schematically shows the structure of a magnetic head in accordance one embodiment.

After fabrication is complete in the stripe height direction, leads to supply a sense current to the lower shield layer 11 and upper shield layer 21 (see FIG. 10) are formed. The leads may be made of Cu, Au, Ta, Rh, Mo, or any other low resistive metal. Another metal layer may be formed at the bottom, top, or both thereof as the case may be. After an insulating protection film is formed as necessary and the top surfaces of the magnetoresistive sensor film, leads and the like are cleaned, the upper shield layer 21 is formed. An upper gap layer which also serves as the underlayer of the upper shield layer 21 may also be formed. In the figure, reference numeral 40 collectively refers to a magnetoresistive effect type read head.

Thereon, an inductive magnetic head 50 is formed via a separation layer 45 to separate the read element section and the write element section. The inductive magnetic head 50 comprises a lower magnetic layer 51, coil-shaped conductor 52, insulating layer 53 and upper magnetic layer 54. While or after the inductive magnetic head is fabricated, annealing may be performed to direct the magnetization of the second ferromagnetic layer 16 to the track width direction. During this annealing, a magnetic field is applied in the track width direction of the read element while the magnetization of the first ferromagnetic layer 14 is kept almost in the stripe height direction. Further, a slider fabrication process is completed by the subsequent process flow including a lapping step in which the magnetic head element is mechanically lapped to a predetermined stripe height, a protection film deposition step in which a protection film is formed to protect the read and write elements in a magnetic storage apparatus, a grooving step in which the air bearing surface is grooved as predetermined shape in order to control the gap (flying height) between the magnetic head and the magnetic recording medium. After the slider fabrication process, a head gimbal assembly in which each magnetic head is fixed to a suspension is completed.

Figure 11:
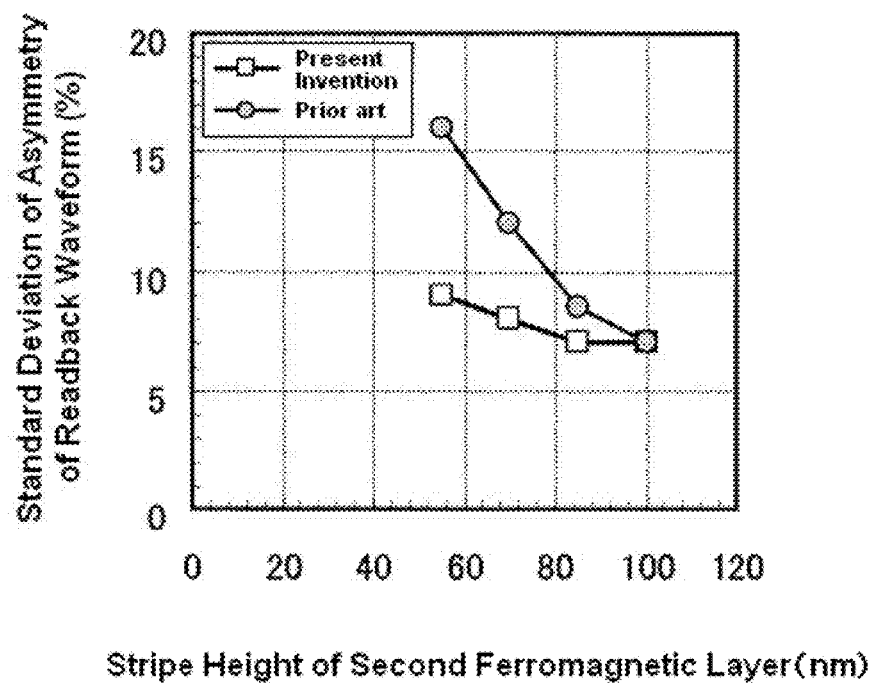
FIG. 11 is a graph showing one advantage of the magnetoresistive head, according to one embodiment, in comparison with a prior art head.

For comparison, prior art magnetic heads were also fabricated according to the process flow shown in FIG. 2. For both prior art magnetic heads and those produced according to one embodiment, the the-cross-track width of the second ferromagnetic layer was fixed to 70 nm while the stripe height (length of the second ferromagnetic layer in the stripe height direction) was varied by controlling the slider lapping process. The read performances of each head were evaluated under the same conditions in terms of recording medium, flying height, and sense current. Of the read performances, asymmetry of a readback waveform is a parameter sensitive to the strength and variation of the longitudinal bias field. Its standard deviation is plotted in FIG. 11. The asymmetry of a readback wavefonn is defined as below in Equation 1.

$$\text{Asymmetry (\%)}=(V_+-V_-)/(V_++V_-)\times 100 \quad \text{Equation 1}$$

where, $V_+$ and $V_-$ denote the positive and negative outputs, respectively. As shown in FIG. 11, the standard deviation of asymmetry of the waveforms reproduced by the magnetic heads fabricated by using the prior art technique is 7% at a stripe height of 100 mu, and remarkably increases to 16% at 55 nm. In the case of the magnetic heads according to some embodiments, the standard deviation is 7% at 100 nm and 9% at 55 nm. This small increase may be attributable to the longitudinal biasing layer 23 whose length in the stripe height direction is made longer in order to reduce the effect of process damage and improve the thermal fluctuation stability.

While a magnetic head prepared in accordance with the first embodiment has the longitudinal biasing layer protection film 231 deposited on the longitudinal biasing layer 23 as hard magnetic layer, a second embodiment prepares a magnetic head without the longitudinal biasing layer protection film 231. When the read track width defining mask material 25, second stripe height defining mask material 261 and stripe height defining mask material 26 are lifted off, corrosion may occur during removal and rinse. With extreme caution given to management of the remover and the after-rinse drying, a magnetic head, according to the second embodiment, may be fabricated without causing corrosion.

Since the head of the second embodiment does not have the longitudinal biasing layer protection film 231, the shield-to-shield distance where the longitudinal biasing layer 23 is disposed can be even narrower than in the first embodiment. Since this makes it possible to narrow the shield-to-shield distance where the magnetoresistive sensor film 20 is disposed while suppressing side reading, still higher recording densities can be realized.

It is known that stability of the read performances is affected by inverse elastic effect. For reducing this affection, the magnetostriction of the second ferromagnetic layer 16 of the magnetoresistive sensor film 20 may be made smaller in a third embodiment. However, a certain level of magnetostriction may have to be allowed to attain a high magnetoresistive ratio. In this case, this affection may be reduced by reducing the stress. Due to the difficulty of stress design, however, modifying surrounding structures of the magnetoresistive sensor film 20 may be practically performed.

Figure 8:
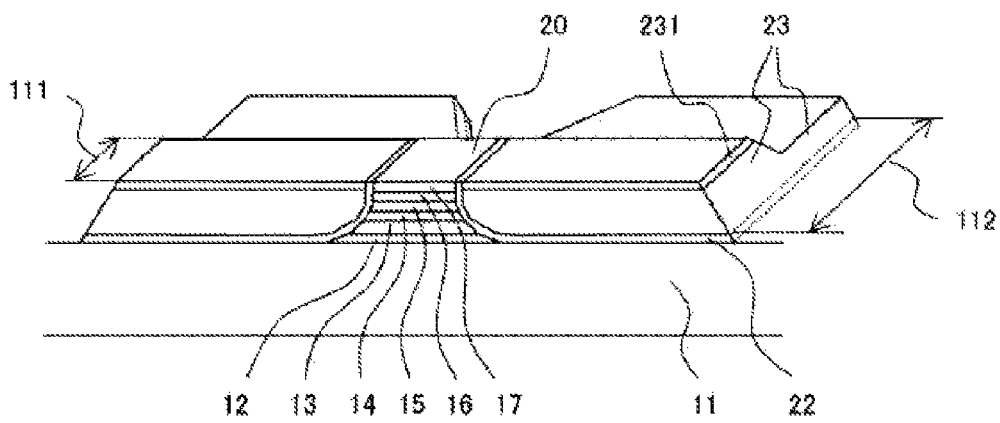
FIG. 8 is a perspective view of a magnetoresistive head in accordance with another embodiment after fabrication of the longitudinal biasing layer is completed.
Figure 9:
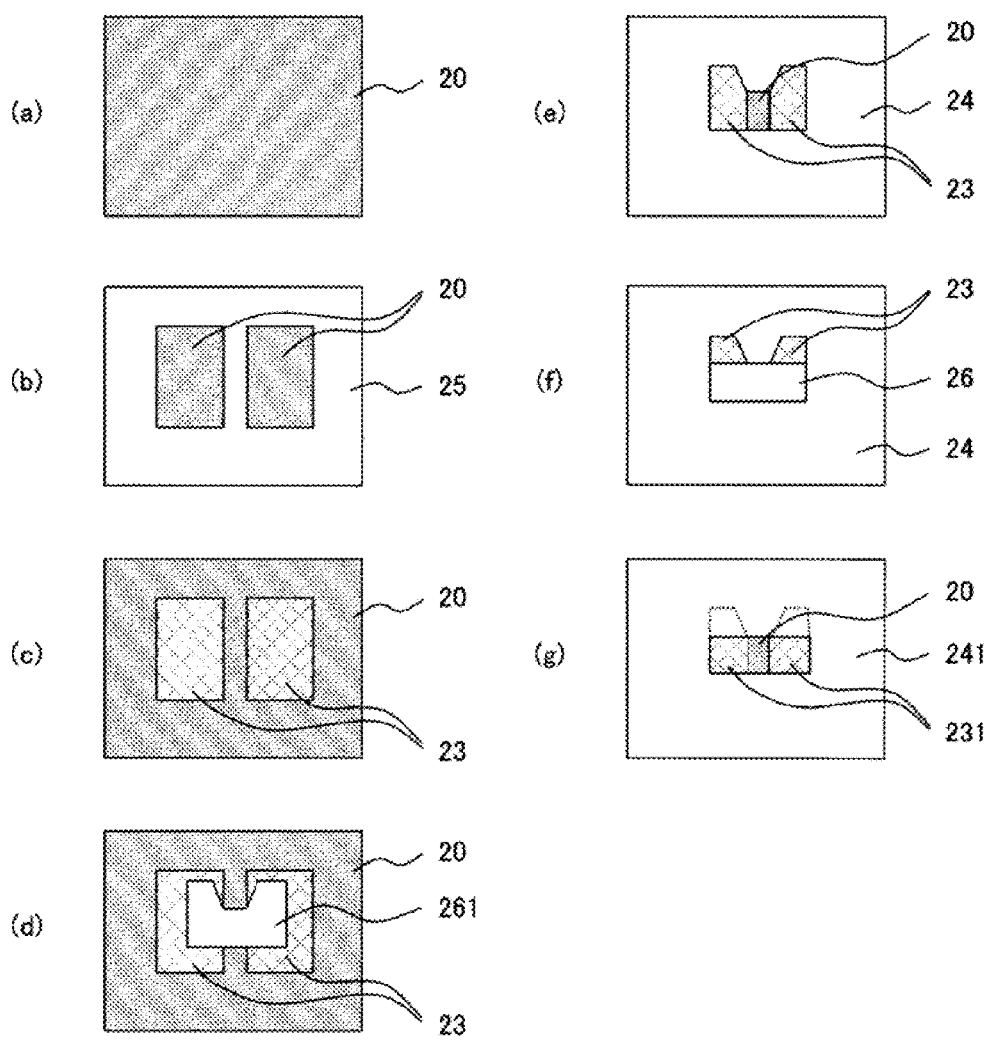
FIG. 9 schematically shows a process flow of a magnetoresistive head in accordance with one embodiment.

From such a point of view, a perspective view of a magnetic head, as shown in FIG. 8, was prepared according to a general process flow shown in FIG. 9. This structure is characterized in that the length of the first ferromagnetic layer 14 in the stripe height is substantially equal to the length of the second ferromagnetic layer 16 in the stripe height direction and shorter than the length of the longitudinal biasing layer 23 in the stripe height direction. Its head fabrication process flow is different from that of the first embodiment in that the second stripe height defining mask material 261 is shaped as in FIG. 9(d) not as in FIG. 6(d). With the length of the longitudinal biasing layer 23 in the stripe height direction fixed longer than that of the second ferromagnetic layer 16 of the magnetoresistive sensor film 20 in the stripe height direction, it is possible to adjust the stress by changing the shape of the second stripe height defining mask material 261, in particular, the opening angle of the concave portion determining the stripe height of the magnetoresistive sensor film 20. In addition, the stress can also be adjusted by changing the length of the first ferromagnetic layer 14 in the stripe height direction between the length of the second ferromagnetic layer 16 in the stripe height direction and the length of the longitudinal biasing layer 23 in the stripe height direction.

For the longitudinal biasing layer 23, a stack of a ferromagnetic layer and an antiferromagnetic layer may be used instead of a hard magnetic layer, as in a fourth embodiment. The ferromagnetic layer may be made of Ni—Fe based alloy, Co—Fe based alloy, Co—Ni—Fe based alloy, etc., while the antiferromagnetic layer may be made of Mn—Ru based alloy, Mn—Rh based alloy, Mn—Pd based alloy, Mn—Ir based alloy, etc. When this structure is used, it is preferable to remove the antiferromagnetic layer while etching is performed, according to FIG. 6(f) or FIG. 9(f), and then deposit a high resistive antiferromagnetic layer made of nickel oxide or similar material as the second stripe height defining insulating layer 241. In this case, magnetization of the portion of the longitudinal biasing layer (ferromagnetic layer) disposed deeper than the second ferromagnetic layer 16 in the stripe height direction can be directed to the track width direction as necessary by performing annealing with a magnetic field.

Although the magnetoresistive sensor film 20 assumed in the embodiments described so far has an intermediate layer of a CPP-GMR film which has a conductive layer or a conductive layer having a current confining layer of a TMR film which has a barrier layer; alternatively, a magnetic semiconductor film or a film which utilizes the phenomena of diffusion/accumulation of polarized spin, for example, may be used. The seed layer 12 and the cap layer 17 are not essential and may be omitted if unnecessary structurally or for manufacturing purposes.

The magnetoresistive head, according to the various embodiments described above, may be formed with the geometrical dimensions of the magnetoresistive sensor film with a high accuracy without using unique manufacture methods. Furthermore, a CPP structure magnetoresistive head with high read performances in which side reading is suppressed and having superior stability can be manufactured at high yields. Therefore, the magnetoresistive head has very high industrial applicability.

While various embodiments have been described above, it should be understood that they have been presented by way of example only, and not limitation. Thus, the breadth and scope of an embodiment of the present invention should not be limited by any of the above-described exemplary embodiments, but should be defined only in accordance with the following claims and their equivalents.

What is claimed is:

1. A magnetoresistive head comprising:
a magnetoresistive sensor film, including:
a stack comprising:
   a pinning layer;
   a first ferromagnetic layer;
   an intermediate layer; and
   a second ferromagnetic layer positioned between a lower shield layer and an upper shield layer,
   wherein a sense current flows across the first ferromagnetic layer, the intermediate layer, and the second ferromagnetic layer; and
a longitudinal biasing layer having a length in a stripe height direction which is longer than a length of the second ferromagnetic layer in the stripe height direction, the longitudinal biasing layer being disposed at each side of the magnetoresistive sensor film via an insulator film for insulation in a track width direction, wherein a surface of the longitudinal biasing layer has a step at the stripe height which changes a thickness of the longitudinal biasing layer across the step so that an air bearing surface section of the longitudinal biasing layer has a larger thickness than any other section, wherein the magnetoresistive sensor film exhibits a change in a resistance thereacross in response to a change of an external magnetic field, wherein the longitudinal biasing layer comprises a ferromagnetic layer, wherein a length of the first ferromagnetic layer in the stripe height direction is longer than the length of the second ferromagnetic layer in the stripe height direction and shorter than the length of the longitudinal biasing layer in the stripe height direction.

2. The magnetoresistive head according to claim 1, wherein the ferromagnetic layer comprising the longitudinal biasing layer is a hard magnetic layer.

3. The magnetoresistive head according to claim 2, wherein the hard magnetic layer has a protective film disposed thereon at the air bearing surface.

4. The magnetoresistive head according to claim 3, wherein the protective film is less than about 10 nm in thickness.

5. The magnetoresistive head according to claim 1, wherein the longitudinal biasing layer comprises a stack of a ferromagnetic layer and an antiferromagnetic layer, and wherein the longitudinal biasing layer has a high resistive antiferromagnetic material deposited thereon in a section thinner than an air bearing surface section.

6. The magnetoresistive head according to claim 5, wherein a length of the first ferromagnetic layer in the stripe height direction is longer than the length of the second ferromagnetic layer in the stripe height direction and shorter than the length of the longitudinal biasing layer in the stripe height direction.

7. A system, comprising:
a magnetic storage medium;
at least one magnetoresistive head as recited in claim 1 for reading from and/or writing to the magnetic storage medium;
a slider for supporting the magnetoresistive head; and
a control unit coupled to the magnetoresistive head for controlling operation of the magnetoresistive head.

8. A method of manufacturing a magnetoresistive head as recited in claim 1, the method comprising:
depositing the magnetoresistive sensor film on the lower shield layer;
depositing a read track width defining mask material on the magnetoresistive sensor film so as to mask a region whose width is a read track width of a sensor section;
removing the magnetoresistive sensor film from an unmasked region disposed on each side of the read track width;
depositing the longitudinal biasing layer in a region where the magnetoresistive sensor film has been removed;
removing the read track width defining mask material;
depositing a second stripe height defining mask material on the magnetoresistive sensor film and the longitudinal biasing layer so as to mask a region which is to become a head element section;
removing the magnetoresistive sensor film and the longitudinal biasing layer from an unmasked region;
depositing a first insulator film for insulation in a stripe height direction;
removing the second stripe height defining mask material;
depositing a first strip height defining mask material on the magnetoresistive sensor film and the longitudinal biasing layer so as to mask an air bearing surface section and to unmask a stripe height end side portion of a section which is covered by the second stripe height defining mask;
thinning the magnetoresistive sensor film and the longitudinal biasing layer in an area in which the mask material is not disposed by limited removal;
depositing a second insulator film for insulation in the stripe height direction; and
removing the first stripe height defining mask material.

9. The method according to claim 8, wherein the longitudinal biasing layer comprises a ferromagnetic layer.

10. The method according to claim 9, wherein a length of the first ferromagnetic layer in the stripe height direction is longer than the length of the second ferromagnetic layer in the stripe height direction and substantially the same as the length of the longitudinal biasing layer in the stripe height direction.

11. The method according to claim 9, wherein a length of the first ferromagnetic layer in the stripe height direction is longer than the length of the second ferromagnetic layer in the stripe height direction and shorter than the length of the longitudinal biasing layer in the stripe height direction.

12. The method according to claim 9, wherein the ferromagnetic layer comprising the longitudinal biasing layer is a hard magnetic layer.

13. The method according to claim 12, wherein the hard magnetic layer has a protective film disposed thereon at the air bearing surface.

14. The method according to claim 13, wherein the protective film is less than about 10 nm in thickness.

15. The method according to claim 8, wherein the longitudinal biasing layer comprises a stack of a ferromagnetic layer and an antiferromagnetic layer, and wherein the longitudinal biasing layer has a high resistive antiferromagnetic material deposited thereon in a section thinner than an air bearing surface section.

16. The method according to claim 15, wherein a length of the first ferromagnetic layer in the stripe height direction is longer than the length of the second ferromagnetic layer in the stripe height direction and shorter than the length of the longitudinal biasing layer in the stripe height direction.

17. A magnetoresistive head, comprising:
a magnetoresistive sensor film, including:
a stack comprising:
a pinning layer;
a first ferromagnetic layer;
an intermediate layer; and
a second ferromagnetic layer positioned between a lower shield layer and an upper shield layer,
wherein a sense current flows across the first ferromagnetic layer, the intermediate layer, and the second ferromagnetic layer; and
a longitudinal biasing layer having a length in a stripe height direction which is longer than a length of the second ferromagnetic layer in the stripe height direction, the longitudinal biasing layer being disposed at each side of the magnetoresistive sensor film via an insulator film for insulation in a track width direction, wherein a surface of the longitudinal biasing layer has a step at the stripe height which changes a thickness of the longitudinal biasing layer across the step so that an air bearing surface section of the longitudinal biasing layer has a larger thickness than any other section,
wherein the magnetoresistive sensor film exhibits a change in a resistance thereacross in response to a change of an external magnetic field,
wherein the longitudinal biasing layer comprises a ferromagnetic layer,
wherein a length of the first ferromagnetic layer in the stripe height direction is longer than the length of the second ferromagnetic layer in the stripe height direction and substantially the same as the length of the longitudinal biasing layer in the stripe height direction.

* * * * *